United States Patent
Hori

(10) Patent No.: US 7,400,726 B2
(45) Date of Patent: Jul. 15, 2008

(54) APPARATUS FOR PREVENTING UNAUTHORIZED USE OF A COPYRIGHTED MEDIUM

(75) Inventor: Koichi Hori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 654 days.

(21) Appl. No.: 10/525,368

(22) PCT Filed: Jul. 7, 2003

(86) PCT No.: PCT/JP03/08603

§ 371 (c)(1),
(2), (4) Date: Feb. 23, 2005

(87) PCT Pub. No.: WO2005/004380

PCT Pub. Date: Jan. 13, 2005

(65) Prior Publication Data

US 2005/0244002 A1    Nov. 3, 2005

(51) Int. Cl.
  *H04N 7/167*  (2006.01)
  *H04K 1/00*   (2006.01)
(52) U.S. Cl. .................. 380/201; 713/182; 713/186; 713/192
(58) Field of Classification Search ............. 726/26–31, 726/34; 713/170, 185–186, 192, 182; 380/200–203, 380/277; 705/57–59
See application file for complete search history.

(56) References Cited

U.S. PATENT DOCUMENTS

| 5,659,613 | A | * | 8/1997 | Copeland et al. ............ 380/202 |
| 5,701,343 | A |   | 12/1997 | Takashima et al. |
| 5,943,423 | A | * | 8/1999 | Muftic ........................ 705/67 |
| 6,425,081 | B1 | * | 7/2002 | Iwamura ..................... 713/176 |
| 2003/0014652 | A1 |   | 1/2003 | Nakayama |

FOREIGN PATENT DOCUMENTS

| JP | 2001-148156 | 5/2001 |
| JP | 2001-331375 | 11/2001 |
| JP | 2002-027231 | 1/2002 |
| JP | 2002-196982 | 7/2002 |
| JP | 2002-258975 | 9/2002 |
| JP | 2002-374244 | 12/2002 |

* cited by examiner

*Primary Examiner*—Hosuk Song
(74) *Attorney, Agent, or Firm*—Leydig, Voit & Mayer, Ltd.

(57) ABSTRACT

An apparatus for preventing an unauthorized use of a copyright medium adapted to identify a purchaser by authentication of the purchaser's fingerprint at the time of purchasing an encrypted copyright medium, so that only the purchaser can reproduce or copy work data recorded in the copyright medium. Data is read from a copyright medium identification database in order to write a copyright medium unique identification database and a cipher key database into a Smart card or other recording mediums using a Smart card or other recording medium data reading/writing device. Moreover, fingerprint data of the purchaser of the copyright medium is read by using a fingerprint authentication device. The purchaser's fingerprint data, the copyright medium unique identification data, and the cipher key are written into the Smart card or other recording medium using the Smart card or other recording medium data reading/writing device.

9 Claims, 3 Drawing Sheets

APPARATUS FOR PREVENTING UNAUTHORIZED USE OF A COPYRIGHTED MEDIUM

TECHNICAL FIELD

The present invention relates to an apparatus for preventing an unauthorized use of a copyright medium, and more particularly to an apparatus for preventing an unauthorized use of a copyright medium adapted to identify a purchaser by means of recognition of a purchaser's fingerprint at the time of purchasing an encrypted copyright medium.

BACKGROUND ART

Conventionally, there have already been suggested systems wherein fingerprint data and a cipher key are written into a copyright medium. For example, Japanese Laid-Open Patent Publication (Kokai) No. 2002-27231 discloses a system wherein biological information such as fingerprint information is directly written and stored in a management area of a recording medium such as a compact disk (CD), a digital video disk (DVD), or the like, which includes previously recorded digital contents composed of image data such as static or dynamic images, audio data such as music or voices, and composite data including image and audio data. In this system, however, there is a need for the fingerprint data or the like to be written into the copyright medium at the time of delivery of the copyright medium. Therefore, the copyright medium need be post-writable, which conflicts with existing structure specifications, thereby increasing a cost of mass production equipment disadvantageously. Furthermore, it is an object of the conventional system to prevent copying or reproduction of the contents, and therefore a purchaser is also inhibited to copy and use the contents. This causes inconveniences such that the purchaser-cannot make a backup copy in case of a product purchased being broken or that the purchaser cannot always have the, copyright medium ready for use in a plurality of places, such as in his/her house, automobile, and mobile audio-visual device. When being broken, the copyright medium purchased can be tracked down using an Smart card or other recording medium and fingerprint data, and thereby it can be reissued. It, however, requires extra cost and time disadvantageously.

Furthermore, Japanese Laid-Open Patent Publication (Kokai) No. 2002-258975 discloses an apparatus and a method, wherein a user's fingerprint image is collated with user's fingerprint data stored in an Smart card, if they match, a logon ID is read from the Smart card, and if it is coincident, the user is authorized to use a terminal concerned. In the apparatus and method for recognizing fingerprint, a user is authenticated at the time of system logon.

DISCLOSURE OF THE INVENTION

It is an object of the present invention to provide an apparatus for preventing an unauthorized use of a copyright medium adapted to identify a purchaser by means of recognition of a purchaser's fingerprint at the time of purchasing the copyright medium, free from the above disadvantages of the conventional copyright mediums.

It is another object of the present invention to provide an apparatus for preventing an unauthorized use of a copyright medium wherein a purchaser only can reproduce or copy work data recorded in the copyright medium.

BEST MODE FOR CARRYING OUT THE INVENTION

The present invention will now be described hereinafter with reference to the accompanying drawings for more detailed description.

Figure 1:
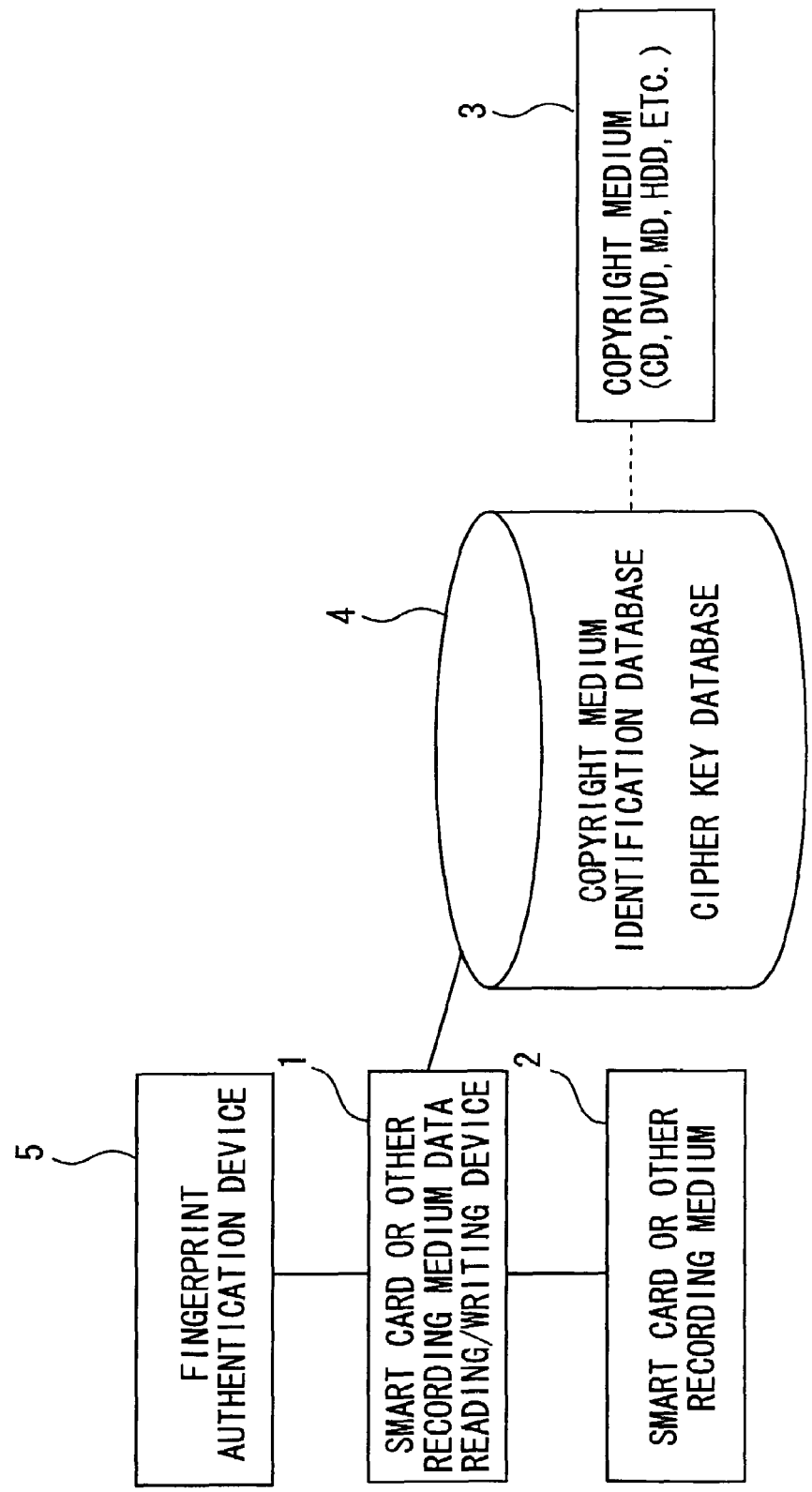
FIG. 1 is an outline system configuration diagram for purchasing a copyright medium of an apparatus for preventing an unauthorized use of the copyright medium according to the present invention.

Referring to FIG. 1, there is shown an outline system configuration diagram for purchasing a copyright medium of an apparatus for preventing an unauthorized use of the copyright medium according to the present invention. It comprises an Smart card or other recording medium data reading/writing device 1, an Smart card or other recording medium 2, an encrypted copyright medium 3 comprising a CD, a DVD, an MD, an HDD or the like, a copyright medium identification database 4 storing a copyright medium identification database and a cipher key database, and a fingerprint authentication device 5 for collating and identifying fingerprint data. With reference to FIG. 1, the system operation in purchasing the copyright medium 3 will be described below. First, a seller of the copyright medium 3 uses the Smart card or other recording medium data reading/writing device 1 to read data from the copyright medium identification database 4 in order to write copyright medium unique identification data and a cipher key for use in unique identification of the encrypted copyright medium 3, which comprises a CD, a DVD, an MD, an HDD or the like to be purchased, into the Smart card or other recording medium 2. Moreover, fingerprint data of a purchaser of the copyright medium 3 is read using the fingerprint authentication apparatus 5. Then, the Smart card or other recording medium data reading/writing device 1 writes the purchaser's fingerprint data, the copyright medium unique identification data, and the cipher key into the Smart card or other recording medium 2.

Figure 2:
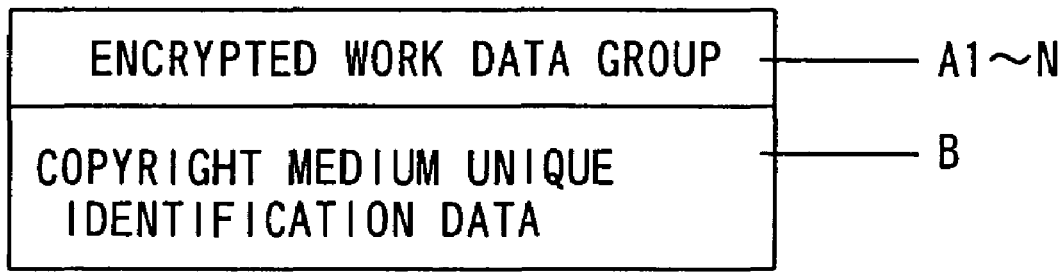
FIG. 2 is a diagram showing a written data structure of the copyright medium for use in the apparatus for preventing an unauthorized use of the copyright medium according to the present invention.

Referring to FIG. 2, there is shown a diagram illustrating a written data structure of the copyright medium for use in the apparatus for preventing an unauthorized use of the copyright medium according to the present invention. It includes a group of encrypted work data A1 to N indicating a plurality of music pieces or other work data and copyright medium unique identification data B.

Figure 3:
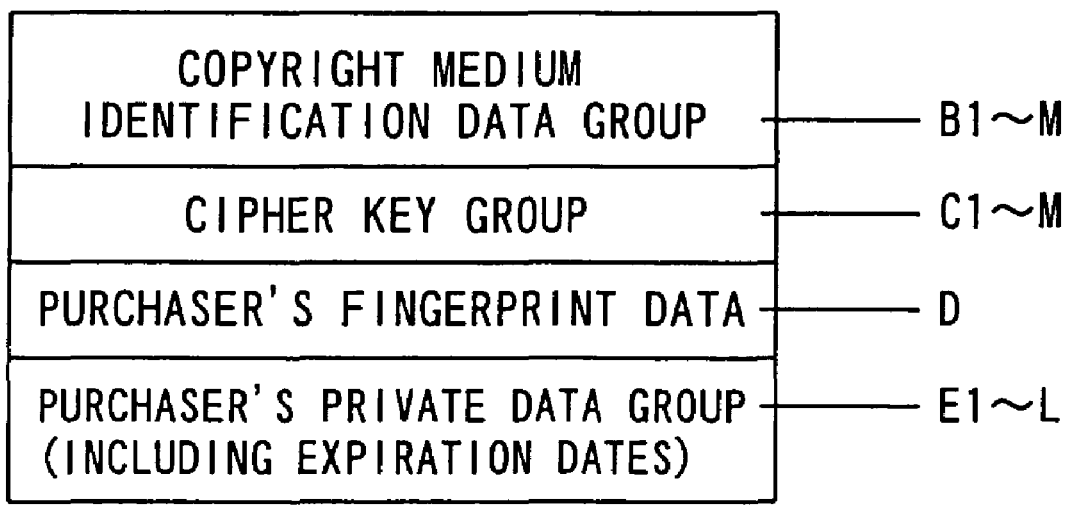
FIG. 3 is a diagram showing a written data structure of an Smart card or other recording medium for use in the apparatus for preventing an unauthorized use of the copyright medium according to the present invention.

Referring to FIG. 3, there is shown a diagram illustrating a written data structure of an Smart card or other recording medium for use in the apparatus for preventing an unauthorized use of the copyright medium according to the present invention. It includes: a group of copyright medium identification data B1 to M indicating a plurality of copyright medium identification data; C1 to M indicating cipher keys corresponding to a plurality of copyright mediums; purchaser's fingerprint data D; and a group of purchaser's private data (including expiration dates) E1 to L indicating a plurality of data varying with the purchaser.

If restrictions are to be imposed on the copyright medium 3, for example, by permitting the purchaser to use the copyright medium 3 only for a fixed period of time or only once at the time of purchasing the copyright medium 3, it is possible to write a group of various identification data E1 to L specifying the restrictions as the group of purchaser's private data (including expiration dates) shown in FIG. 3 simultaneously.

The Smart card or other recording medium 2 can be reused and be used for purchasing a plurality of copyright mediums 3 since a plurality of the copyright medium unique identification data in FIG. 2 can be written into a new Smart card or other recording medium 2 issued once.

Furthermore, in a rental service or the like of copyright mediums 3, it is also possible to delete the relevant copyright medium unique identification data B in FIG. 2 when the copyright medium 3 is returned.

Still further, it is also possible to record a total number of purchases, a total period of rental service, or any other data by means of the group of the purchaser's private data (including expiration dates) E1 to L shown in FIG. 3, and possible to leave individual records by associating the above data with the copyright medium unique identification data B.

Figure 4:
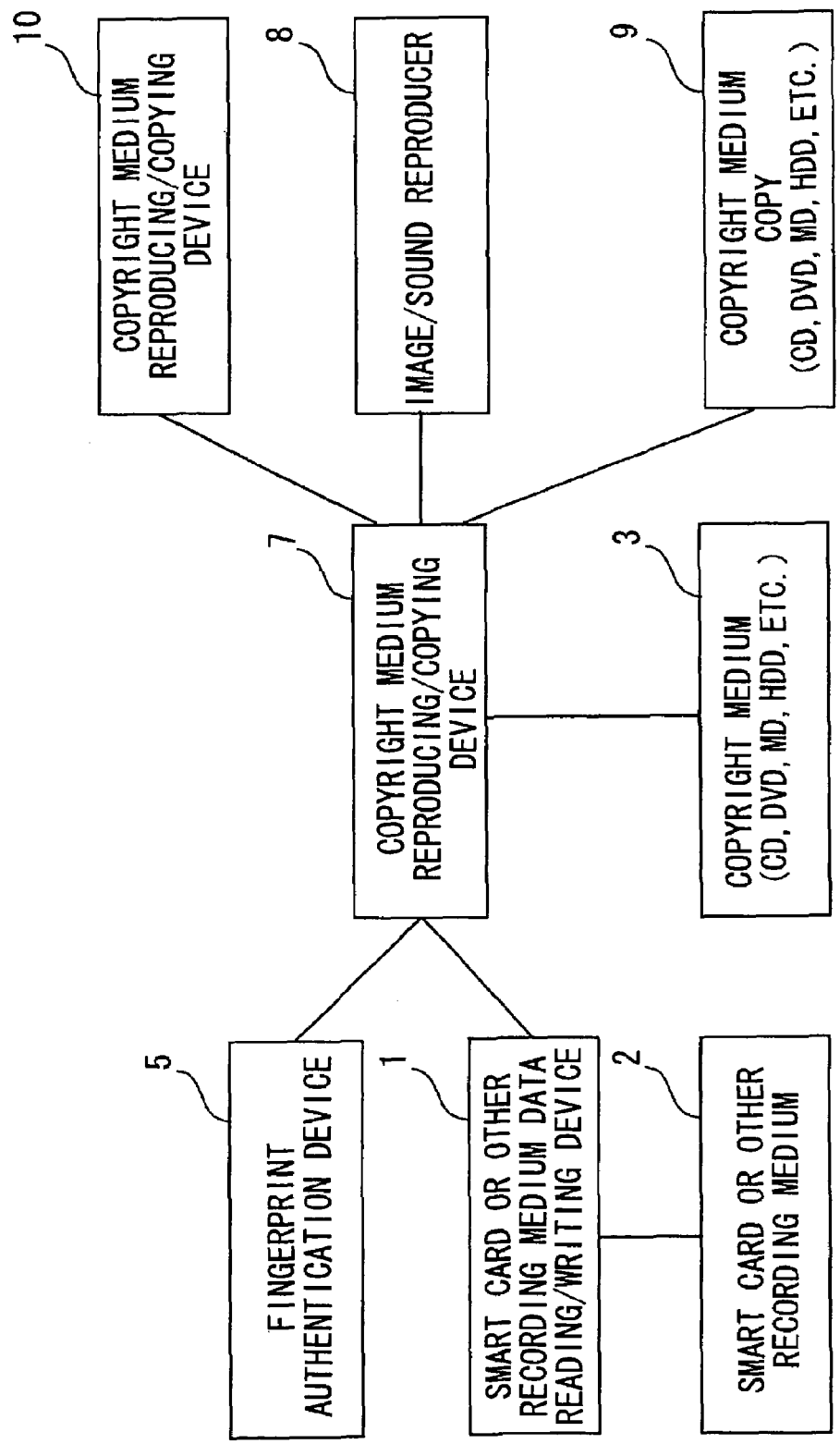
FIG. 4 is an outline system configuration diagram for reproducing or copying from the copyright medium of the apparatus for preventing an unauthorized use of the copyright medium according to the present invention.

Referring to FIG. 4, there is shown an outline system configuration diagram for reproducing or copying from the copyright medium of the apparatus for preventing an unauthorized use of the copyright medium according to the present invention. It comprises an Smart card or other recording medium data reading/writing device 1, an Smart card or other recording medium 2, an encrypted copyright medium 3 comprising a CD, a DVD, an MD, an HDD, or the like, a fingerprint authentication device 5 for collating and identifying fingerprint data, a copyright medium reproducing/copying device 7, an image/sound reproducer 8, a copyright medium copy 9 comprising a CD, DVD, MD, HDD or other copy, and another copyright medium reproducing/copying device 10.

With reference to FIG. 4, the system operation will be described regarding a condition where the purchaser of the copyright medium reproduces or copies the data from the copyright medium 3. First, the data is loaded from the copyright medium 3 and the Smart card or other recording medium 2 into the copyright medium reproducing/copying device 7. Then, the fingerprint authentication device 5 reads a fingerprint of the purchaser of the copyright medium 3 and collates the fingerprint with purchaser's fingerprint data D recorded in the IC or other recording medium 2. If they match, the encrypted data in the copyright medium can be decoded and reproduced using the image/sound reproducer 8 or copied after transferring the group of the encrypted work data A1 to N and the copyright medium unique identification data B to another copyright medium reproducing/copying device 10 connected.

Also when the copyright medium copy 9 is reproduced or copied, there is always a need for fingerprint authentication with the Smart card or other recording medium 2 and the fingerprint authentication device 5. Therefore, a person other than the purchaser or a third party cannot use the work data.

It should be noted, however, that the purchaser can use the same copyright medium purchased by the third party.

A feature of the present invention resides in writing purchaser's fingerprint data, identification data of the relevant copyright medium, and a cipher key into an Smart card or other recording medium when purchasing an encrypted copyright medium.

Another feature of the present invention is that a purchaser is identified by means of fingerprint authentication with an Smart card or other recording medium, which includes the recorded purchaser's fingerprint data and cipher key, before the purchaser is permitted to get decoded data out of the relevant copyright medium.

When the purchaser reproduces or copies the encrypted data of the copyright medium, the present invention can be put into practice by collating the fingerprint data in the Smart card or other recording medium including the stored cipher key and purchaser's fingerprint data with the read fingerprint data and identifying the purchaser. Thereby, it is possible to permit the purchaser only to reproduce or copy work previously written into the recording medium such as a CD or a DVD, thus preventing distribution or sales of illegally copied work to a third party.

According to the present invention, a regular purchaser can make a copy for use in his/her own viewing or listening. Therefore, the purchaser can make a copy into a plurality of recording mediums (including a built-in memory) in his/her house, automobile, or mobile audio-visual device, if necessary, to view or listen to the work.

According to the present invention, a purchaser can be identified, and therefore there is no need to write purchaser's fingerprint data or other different data into the copyright medium individually afterward, thereby enabling mass production of copyright mediums conforming to the existing structure specifications.

According to the present invention, even if a purchaser distributes a copyright medium whose copy has been made by the purchaser to a third party, the third party cannot use it.

According to the present invention, the arrangement may be such that the Smart card or other recording medium and the fingerprint authentication device only are detachable from the copyright medium reproducing/copying device, instead of providing a fingerprint authentication device in each of a plurality of copyright medium reproducing/copying devices. Thereby, the Smart card or other recording medium and the fingerprint authentication device can be connected to the plurality of copyright medium reproducing/copying devices.

By applying the same mechanism to sales of encrypted work data using the Internet or other means, an unauthorized use of the data can be prevented according to the present invention.

According to the present invention, it is possible to write cipher keys, which correspond to identification data of a plurality of copyright mediums respectively, into a single Smart card or other recording medium. Therefore, the purchaser can use a lot of copyright mediums with the single Smart card or other recording medium.

The present invention is readily available for a configuration in which a fingerprint authentication function is integrated with the Smart card or other recording medium.

INDUSTRIAL APPLICABILITY

As described hereinabove, an apparatus for preventing an unauthorized use of a copyright medium according to the present invention is adapted to identify a purchaser by means of purchaser's fingerprint authentication at the time of purchasing an encrypted copyright medium, so that only the purchaser can reproduce or copy work data previously recorded in the copyright medium. Therefore, it is useful as an apparatus for preventing an unauthorized use of the copyright medium.

What is claimed is:

1. An apparatus for preventing an unauthorized use of a physical copyrighted medium, comprising:
   an encrypted physical copyrighted medium for sale;
   a copyrighted medium identification database storing a copyrighted medium unique identifier uniquely identifying said physical copyrighted medium and a cipher key for said physical copyrighted medium;
   a recording medium;
   a recording medium data reading/writing device, for writing data into said recording medium; and
   a fingerprint authentication device for collating and identifying fingerprint data of a purchaser of said physical copyrighted medium, wherein
      data read from said copyrighted medium identification database, including the copyrighted medium unique identifier and the cipher key for said physical copyrighted medium, are written into said recording medium using said recording medium data reading/writing device,
      fingerprint data of the purchaser of said physical copyrighted medium is read using said fingerprint authentication device, and
      the fingerprint data of the purchaser, the copyrighted medium unique identifier, and the cipher key for the physical copyrighted medium are written into said recording medium using said recording medium data reading/writing device.

2. The apparatus according to claim 1, wherein the data written into or read from said recording medium has a structure comprising
   a group of a plurality of copyrighted medium identifiers,
   a group of cipher keys corresponding to a plurality of physical copyrighted, media purchaser's fingerprint data for said physical copyrighted media,
   and a group of purchaser's private data.

3. The apparatus according to claim 1, wherein said recording medium is a Smart card.

4. The apparatus according to claim 3, wherein encrypted digital data written into said recording medium has a structure including
   a group of identification data of recording media, each recording medium having the encrypted digital data recorded therein,
   a group of cipher keys corresponding to the plurality of recording media,
   purchaser's fingerprint data for said recording media, and
   a group of purchaser's private data.

5. The apparatus according to claim 3, further comprising:
   a recording medium reproducing/copying device for decoding and reproducing or copying encrypted digital data with authorization for decoding the encrypted digital data using the cipher key data given by said fingerprint authentication device; and
   a reproducing device for reproducing the encrypted digital data after decoding.

6. An apparatus for preventing an unauthorized use of a physical copyrighted medium, comprising:
   an encrypted physical copyrighted medium for sale;
   a copyrighted medium identification database storing a copyrighted medium unique identifier uniquely identifying said physical copyrighted medium and a cipher key for said physical copyrighted medium;
   a recording medium;
   a recording medium data reading/writing device, for writing data into said recording medium;
   a fingerprint authentication device for collating and identifying fingerprint data of a purchaser of said physical copyrighted medium;
   a copyrighted medium reproducing device for reproducing or copying data from said physical copyrighted medium; and
   an image/sound reproducer, wherein
      data is loaded from said physical copyrighted medium and said recording medium into said copyrighted medium reproducing device, and
      a fingerprint of the purchaser of said physical copyrighted medium is read using said fingerprint authentication device and collated with purchaser's fingerprint data of the purchaser recorded in said recording medium, and, if the fingerprint of the purchaser and the fingerprint data of the purchaser match, encrypted data in said physical copyrighted medium is decoded and reproduced by said image/sound reproducer.

7. The apparatus according to claim 6, wherein said recording medium is a Smart card.

8. An apparatus for preventing an unauthorized use of a physical copyrighted medium, comprising:
   an encrypted physical copyrighted medium for sale;
   a copyrighted medium identification database storing a copyrighted medium unique identifier uniquely identifying said physical copyrighted medium and a cipher key for said physical copyrighted medium;
   a recording medium;
   a recording medium data reading/writing device, for writing data into said recording medium;
   a fingerprint authentication device for collating and identifying fingerprint data of a purchaser of said copyrighted medium;
   a copyrighted medium reproducing/copying device for reproducing or copying data from said copyrighted medium; and
   an image/sound reproducer, wherein
      data is loaded from said physical copyrighted medium and said recording medium into said copyrighted medium reproducing/copying device, and
      a fingerprint of the purchaser of said physical copyrighted medium is read using said fingerprint authentication device and collated with purchaser's fingerprint data of the purchaser recorded in said recording medium, and, if the fingerprint of the purchaser and the fingerprint data of the purchaser match, encrypted data in said physical copyrighted medium is decoded and reproduced by said image/sound reproducer or copied after transferring the copyright medium unique identifier and the cipher key for the physical copyrighted medium to another copyrighted medium reproducing/copying device.

9. The apparatus according to claim 8, wherein said recording medium is a Smart card.

* * * * *